(12) United States Patent
Baek et al.

(10) Patent No.: US 9,909,562 B2
(45) Date of Patent: Mar. 6, 2018

(54) WIND TURBINE BLADE CONTROL METHOD

(71) Applicant: LM WP PATENT HOLDINGS A/S, Kolding (DK)

(72) Inventors: Peter Baek, Kolding (DK); Christian Frank Andersen, Kolding (DK); Mark Olaf Slot, Bryrup (DK); Casper Skovby, Esbjerg (DK); Simon Berg Bojesen, Kolding (DK); Morten Ravn, Kolding (DK); Michael Klitgaard, Odense S (DK)

(73) Assignee: LM WP PATENT HOLDING A/S, Kolding (DK)

( * ) Notice: Subject to any disclaimer, the term of this patent is extended or adjusted under 35 U.S.C. 154(b) by 810 days.

(21) Appl. No.: 14/365,375

(22) PCT Filed: Dec. 5, 2012

(86) PCT No.: PCT/EP2012/074442
§ 371 (c)(1),
(2) Date: Jun. 13, 2014

(87) PCT Pub. No.: WO2013/087468
PCT Pub. Date: Jun. 20, 2013

(65) Prior Publication Data
US 2014/0334928 A1 Nov. 13, 2014

(30) Foreign Application Priority Data

Dec. 15, 2011 (GB) .................................. 1121590.2

(51) Int. Cl.
*F03D 7/02* (2006.01)
*F03D 7/04* (2006.01)

(52) U.S. Cl.
CPC ......... *F03D 7/0232* (2013.01); *F03D 7/0296* (2013.01); *F03D 7/043* (2013.01);
(Continued)

(58) Field of Classification Search
CPC ....................................................... F03D 7/045
See application file for complete search history.

(56) References Cited

U.S. PATENT DOCUMENTS

| 7,632,068 B2 * | 12/2009 | Bak | F03D 1/0641 |
| | | | 416/132 B |
| 8,827,644 B2 * | 9/2014 | Behrens | F03D 1/0641 |
| | | | 416/24 |
| 2007/0036653 A1 | 2/2007 | Bak et al. | |

FOREIGN PATENT DOCUMENTS

| DE | 102010013429 A1 | 7/2011 |
| WO | 2010124914 A2 | 11/2010 |

(Continued)

OTHER PUBLICATIONS

Andersen et al (Deformable trailing edge flaps for modern megawatt wind turbine controllers using strain gauge sensors; Wind Energy 2010, published online Dec. 9, 2009).*

(Continued)

*Primary Examiner* — Justin Seabe
*Assistant Examiner* — Juan G Flores
(74) *Attorney, Agent, or Firm* — Nath, Goldberg & Meyer; Jerald L. Meyer; Tanya E. Harkins

(57) ABSTRACT

A control method for a wind turbine, in particular for a wind turbine blade is described. The control method makes use of the blade mode shapes, or natural vibration shapes, of the blade to detect the excitement level of the blade natural vibrations, and controls active lift devices on the blade in an effort to reduce the excitement levels, to reduce loading in the blade and the overall wind turbine structure. There is also (Continued)

provided a method of designing a wind turbine blade for use in such a method.

14 Claims, 11 Drawing Sheets

(52) U.S. Cl.
CPC .......... *F03D 7/045* (2013.01); *F05B 2240/31* (2013.01); *Y02E 10/721* (2013.01); *Y02E 10/723* (2013.01); *Y02P 70/523* (2015.11)

(56) References Cited

FOREIGN PATENT DOCUMENTS

WO      WO 2010124914 A2 * 11/2010 ........... F03D 1/0641
WO      2011057633 A2     5/2011

OTHER PUBLICATIONS

Andersen, et al. "Deformable trailing edge flaps for modern mega-watt wind turbine controllers using strain gauge sensors". Wind Energy, 2010, pp. 193-206.

Larsen, et al. "Modal Analysis of Wind Turbine Blades" Riso National Laboratory, Roskilde, Denmark, Feb. 2002, pp. 1-72.

* cited by examiner

WIND TURBINE BLADE CONTROL METHOD

This is a National Phase Application filed under 35 U.S.C. 371 as a national stage of PCT/EP2012/074442, filed Dec. 5, 2012, and claims priority benefit from Great Britain Patent Application No. 1121590.2, filed Dec. 15, 2011, the content of each of which is hereby incorporated by reference in its entirety.

FIELD OF THE INVENTION

The present invention relates to a control method for a wind turbine blade, and a method of designing a wind turbine blade, and a wind turbine blade designed according to the method.

BACKGROUND OF THE INVENTION

Active aerodynamic devices are currently being investigated for use in wind turbine blades in order to decrease the time varying loads on the structure. Active aerodynamic devices (AAD) is the broad term for devices which can manipulate the aerodynamics of the blade sections in a variable and controllable manner. An example of an active aerodynamic device is the trailing edge flap, which is very similar to the outboard aileron of an airplane wing. By mounting such devices on the blades and appropriate control, the loads which are induced by turbulence can partly be cancelled out.

It is a continued challenge to design blades for wind turbines having such AADs in locations to provide maximum performance, as well as an appropriate method of control for such AADs.

It is an object of the invention to provide a new control method for a wind turbine blade using AADs, as well as a new design method to appropriately locate such AADs on a blade.

SUMMARY OF THE INVENTION

Accordingly, there is provided a method of controlling a wind turbine blade during operation of a wind turbine to reduce root moments of the blade, the blade having a tip end and a root end, the method comprising the steps of:
 identifying an excited mode shape of the wind turbine blade; and
 adjusting at least one active lift device provided on said blade to reduce a modal vibration of said blade during operation of said wind turbine, wherein said step of adjusting is based on said excited mode shape.

By basing the control of the wind turbine blade on the blade modes, several advantages are presented over the prior art. The blade-mode-based control can provide for a faster control response compared to standard root moment control systems, as well as a reduction in fatigue loads experienced by the wind turbine. Also, the blade-mode-based control presents a significant reduction in computational requirements when compared with advanced model simulation-based control.

Preferably, said step of identifying an excited mode shape comprises:
 measuring or deriving a deflection of said wind turbine blade, and
 comparing said measured deflection with at least one known mode shape of said wind turbine blade to determine an excitement level for said at least one mode shape,
 wherein said step of adjusting comprises actuating said at least one active lift device based on said excitement level to reduce the magnitude of said excited mode shape, to reduce a modal vibration of said blade.

The level of excitement of the mode shapes of the blade are measured, and the actuation level of the active lift devices are operated based on said excitement level. It will be understood that the step of measuring or deriving a deflection of the blade may be based on the output of any suitable sensor or array of sensors, e.g. accelerometers, blade moment sensors, strain gauges, optical deflection sensors, position sensors (e.g. GPS sensors), etc.

Preferably, the modal vibration of said blade is based on the excitement of a mode 1 shape of said blade, and wherein the method comprises the steps of:
 providing at least a first active lift device at a location towards the tip end of said blade; and
 actuating said at least a first active lift device to control the excitement level of said mode 1 shape, using the excitement co-ordinate of said mode 1 shape as an input to said at least a first active lift device.

It will be understood that the mode 1 shape is taken as the first natural frequency or mode of the wind turbine blade.

It will be understood that the excitement co-ordinate is the instantaneous excitement level of the mode of the wind turbine blade.

The excitement co-ordinate is used as the input to a feedback controller for the active lift device. This provides a simple control system, which may be easily tuned to optimize performance for individual blade designs.

Preferably, the modal vibration of said blade is substantially provided by a combination of the excitement of a mode 1 shape and the excitement of a mode 2 shape of said blade, and wherein the method comprises the steps of:
 providing first and second active lift devices on the blade, said first and second active lift devices selectively actuatable to control said mode 1 and mode 2 shapes, wherein the location of said first and second active lift devices on the blade are selected to provide minimum interference between the mode 1 and mode 2 shapes as the active lift devices are actuated.

Controlling the first and second blade modes using active lift devices results in a relatively simple second order control system, which can be easily tailored to the characteristics of individual blade designs. By minimizing interference or cross-talk between the active lift devices, this provides from optimal control of each of blade mode 1 and 2, without simultaneously exciting the other blade mode.

It will be understood that the mode 2 shape of the blade is taken as the second natural frequency or mode of the wind turbine blade.

Preferably, the method comprises the steps of:
 providing a first active lift device at a location along the length of the blade between the node of said mode 2 shape and the tip end of the blade; and
 providing a second active lift device at a location along the length of the blade between the node of said mode 2 shape and the root end of the blade.

Positioning the active lift devices on either side of the node of the blade mode 2 shape, this provides for maximum balanced control of the blade mode 2 shape, while simultaneously providing for efficient control of the relatively dominant blade mode 1 shape.

It will be understood that the node of the blade mode 2 shape refers to the point at which the blade mode shape crosses or intersects with the normal axis.

Preferably, said step of comparing comprises analyzing said measured deflection to determine an excitement value for the mode 1 shape of the blade and an excitement value for the mode 2 shape of the blade, and wherein said step of actuating comprises actuating said first active lift device and said second active lift device based on a combination of the excitement values for the mode 1 and mode 2 shapes of the blade.

By performing analysis of the first and second blade mode shapes, and controlling the active lift devices on the basis of these mode shapes, the blade can be regulated to provide maximum control of fatigue loads and moments in the blade and the greater wind turbine structure.

Preferably, the method comprises the step of:
comparing said excitement value for the mode 1 shape of the blade with a threshold value, and
when said mode 1 excitement value exceeds said threshold value, performing a mode 1 control operation, and
when said mode 1 excitement value is less than said threshold value, performing a mode 1 control operation and a mode 2 control operation.

By comparing the excitement levels with a threshold, it is possible to tailor the response of the control system to focus on reducing the mode 1 excitement when the mode 1 is considerably dominant. At times when mode 1 is less dominant, i.e. when the excitement of mode 1 is beneath the threshold, then the control system seeks to reduce both mode 1 and mode 2.

Preferably, said step of performing a mode 1 control operation comprises actuating said active lift devices to reduce the magnitude of the excited blade mode 1 shape.

Preferably, said step of performing a mode 2 control operation comprises actuating said active lift devices to reduce the magnitude of the excited blade mode 2 shape.

Preferably, the method comprises the steps of:
controlling the mode 1 shape of said blade by actuating said first and second active lift devices in the same direction; and
controlling the mode 2 shape of said blade by actuating said first and second active lift devices in opposite directions.

There is also provided a wind turbine having a controller having computer-readable instructions stored on a computer-readable memory storage, the instructions when read operable to implement any of the above method steps.

There is further provided a method of designing a wind turbine blade, comprising:
providing a wind turbine blade;
performing a modal analysis of said wind turbine blade to determine the mode 1 and mode 2 shapes of the wind turbine blade; and
positioning at least one active lift device on said wind turbine blade based on said at least one determined mode shape, such that an excitement level of said at least one determined mode shape can be controlled by actuation of said active lift device.

By analyzing the blade mode shapes, it is possible to position the active lift device for maximum control of said mode shapes, resulting in reduced blade fatigue loads during operation of the blade. Preferably, the design method is used to design a blade for use with the above described control method.

Preferably, said step of positioning comprises providing an active lift device on said wind turbine blade at a location along the length of the blade corresponding to the node of said mode 2 shape, such that said active lift device is operable to control an excitement level of said mode 1 shape without affecting an excitement level of said mode 2 shape.

Providing the active lift device at the node of the mode 2 shape means that control of the mode 1 shape can be providing with no cross-talk or interference with the blade mode 2 shape, i.e. actuating the device at the node will have no effect on the excitement of the mode 2 shape of the blade. By providing the active device at the node, it will be understood that the device is positioned along the length of the blade, centred at the node of the mode 2 shape.

Alternatively, said step of positioning comprises providing a first active lift device and a second active lift device on said wind turbine blade,
wherein said first active lift device is provided at a first location along the length of the blade and said second active lift device is provided at a second location along the length of the blade,
wherein the location of said first and second active lift devices on the blade are selected to provide minimum cross-talk/interference between the mode 1 and mode 2 shapes as the active lift devices are actuated.

Preferably, said first active lift device is provided at a location along the length of the blade between the node of said mode 2 shape and the tip end of the blade, and wherein said second active lift device is provided at a location along the length of the blade between the node of said mode 2 shape and the root end of the blade, such that the active lift devices are operable to control excitement levels of said mode 1 shape and said mode 2 shape.

Preferably, said at least one active lift devices comprises an aerodynamic flap provided at the trailing edge of the wind turbine blade.

Standard nomenclature used:
D Damping matrix
K Stiffness matrix
M Mass matrix
c Airfoil chord length [m]
$C_l$ Sectional lift coefficient of the airfoil, $C_l=l/(\frac{1}{2}\rho U^2 c)$, where $\rho$ is the fluid density.
$F_{aero}$ External aerodynamic forces
Mz Bending moment around out of place axis (flapwise moment)
U Flow velocity
x Rotor radial position
y Displacement in the out of rotor plane direction
$\alpha$ Angle of attack of airfoil
$\Delta C_l$ Change in lift coefficient, $C_l$ when the AAD is activated
AAD Active Aerodynamic Device, e.g. a flap, spoiler, tab, fluid injection device, may also be referred to as an Active Lift Device
BMS Bending moment sensor, e.g. calibrated strain gauge
$X_c$ Center point of variable X
$X_\infty$ Free stream property of variable X
$X_{el}$ single beam element of variable X

DESCRIPTION OF THE INVENTION

An embodiment of the invention will now be described, by way of example only, with reference to the accompanying drawings, in which:
FIG. 1 shows a wind turbine;
FIG. 2 shows a schematic view of a wind turbine blade according to the invention;
FIG. 3 shows a schematic view of an airfoil profile of the blade of FIG. 2;
FIG. 4 is an illustrative view of a wind turbine blade having an Active Aerodynamic or Active Lift Device;

Common elements between the different embodiments will be referred to using the same reference numerals.

Figure 1:
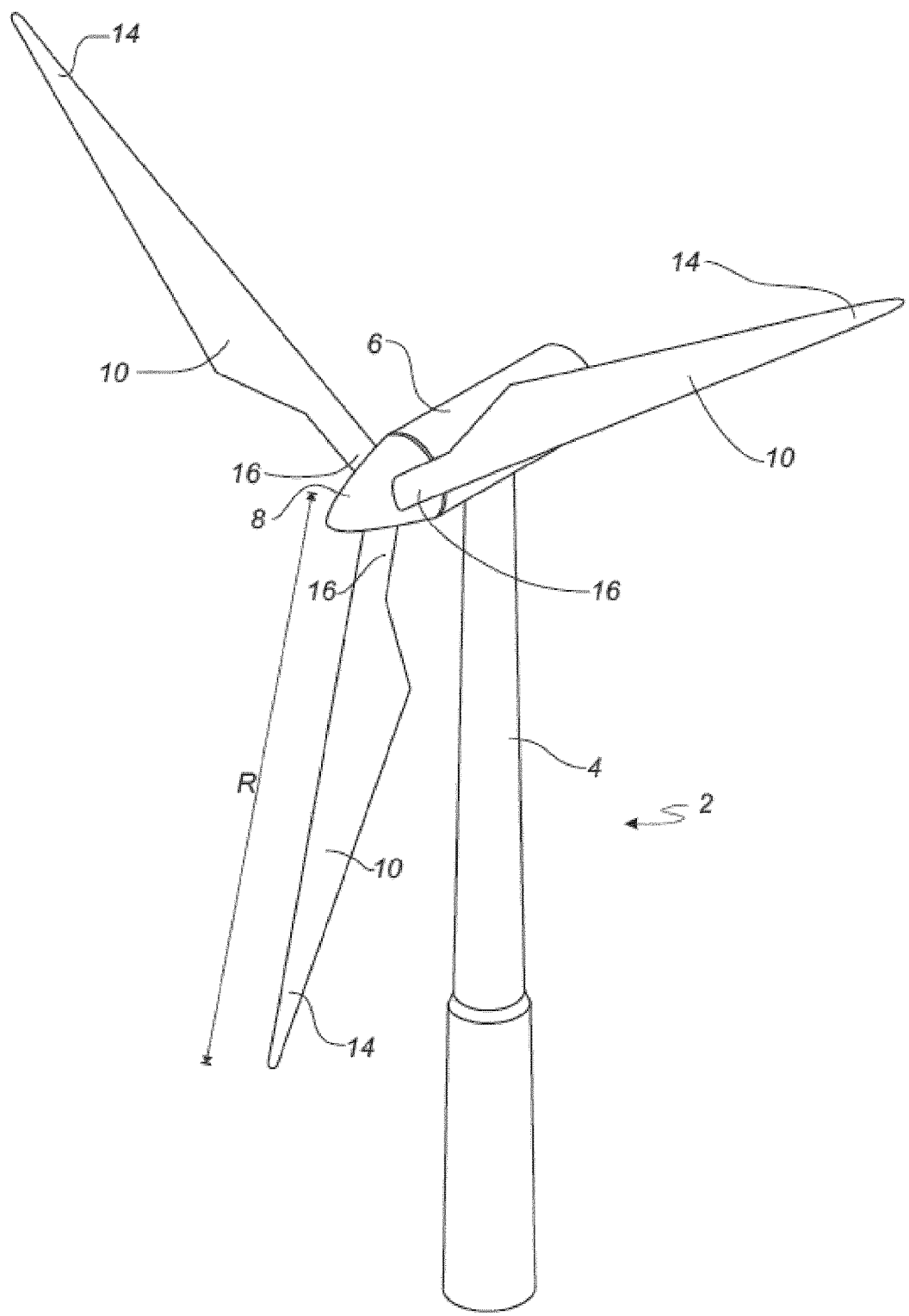

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root end 16 nearest the hub and a blade tip end 14 furthest from the hub 8. The rotor has a radius denoted R.

Figure 2:
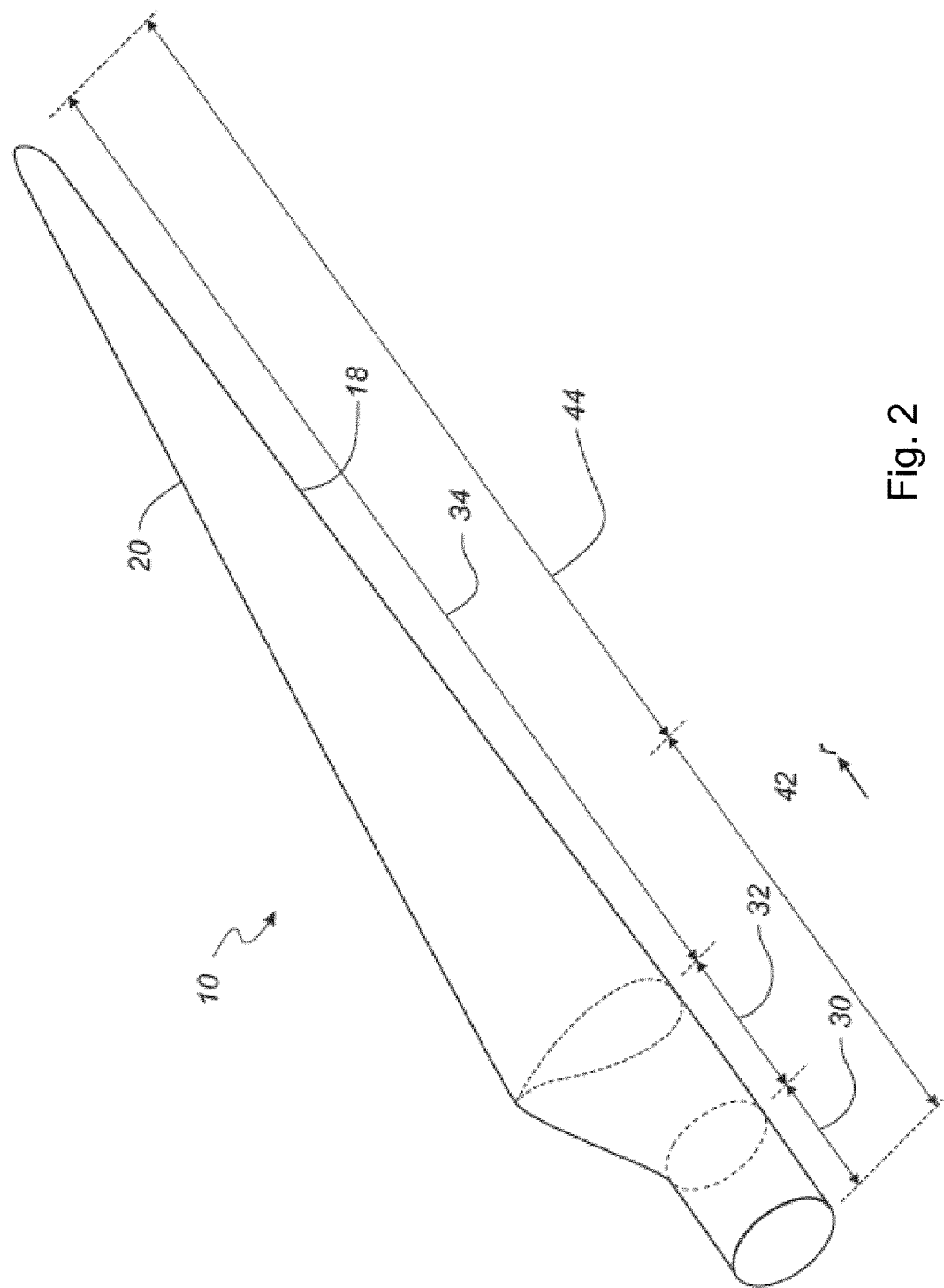

FIG. 2 shows a schematic view of a first embodiment of a wind turbine blade 10 according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
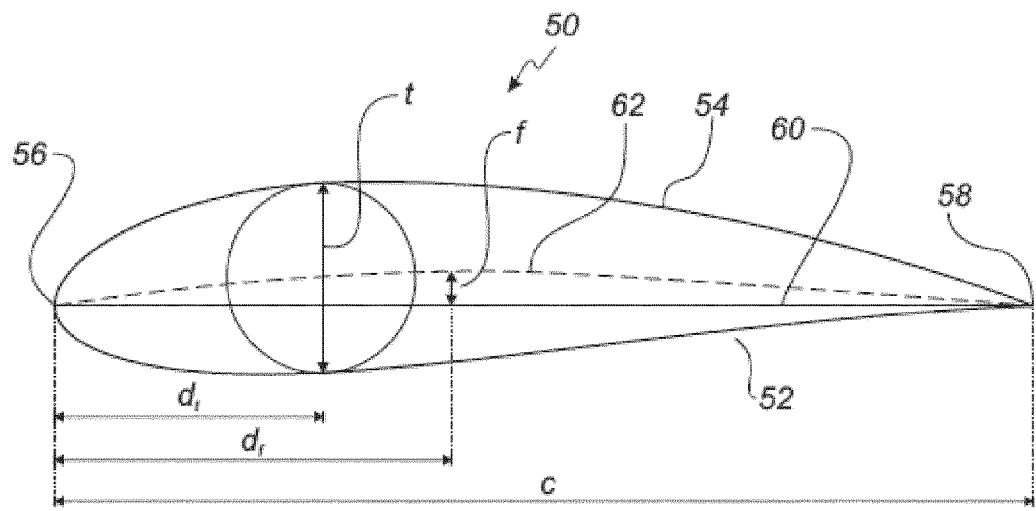

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Figure 4:
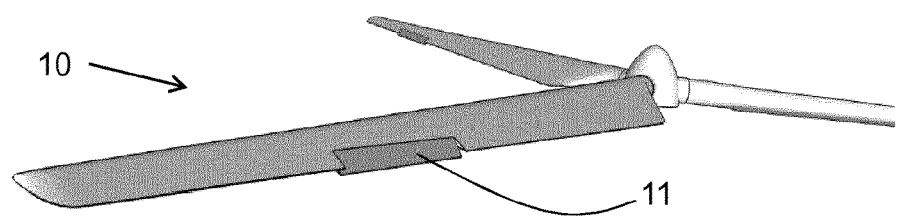

FIG. 4 shows an example of a wind turbine rotor blade 10 with a trailing edge flap 11, deflected −10 degrees.

1. INTRODUCTION

A simple model for the blade is developed. The model is a finite element model of the flapwise deflection of the blade (basically the direction out of the rotor plane). No coupling with the edgewise (in rotor plane) deflections or with torsion is considered. The rotor aerodynamics (induced wake and tip effects) have been neglected, but the aerodynamic damping due to the dynamic deflection of the blade have been included. Gyroscopic couplings and centrifugal stiffening have also been neglected, for the sake of simplicity. The aerodynamic forces of the active aerodynamic devices can be controlled. As an example the Upwind 5MW Reference Turbine Blade has been used, which is 61.5 m long (for details see Jonkman, J., Butterfield, S., Musial, W., Scott, G., 2009. Definition of a 5-MW Reference Wind Turbine for Offshore System Development Definition of a 5-MW Reference Wind Turbine for Offshore System Development. Tech. Rep. February, NREL).

Earlier studies by Andersen (Andersen, P. B., 2010. Advanced Load Alleviation for Wind Turbines using Adaptive Trailing Edge Flaps: Sensoring and Control Risoe-PhD-Report. Ph.D. thesis, Technical University of Denmark) on AAD have shown that the strain gauge sensor, which was used to control the flaps, should be placed very far outboard (approximately 28 m from the root) in order to control the flaps.

It is proposed to use the mode shapes of the blade to control the AADs. Most earlier studies have used a local measurement of the strain of the blade or local displacement measurements. The mode shapes are the inherent degrees of freedom of the blade, and it is proposed that they may be used when trying to dampen the vibrations of the blade.

2. THE MODEL

The beam model consists of N coupled Bernoulli Euler beam elements, which are standard cubic beam elements.

Each beam element has 4 degrees of freedom, 2 displacements in the y direction and 2 rotations about an out of plane axis, $\theta$.

Figure 5:
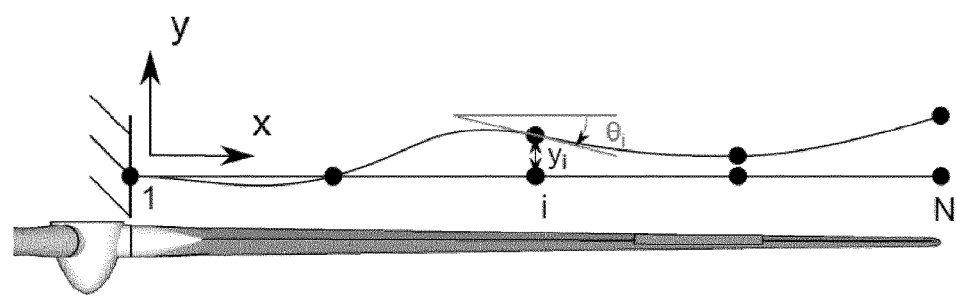
FIG. 5 is an illustration of the coordinate system used.

Textbook examples of element mass and stiffness matrices are taken, e.g. Rao, S. S., 2004. Mechanical Vibrations. Prentice Hall With reference to FIG. 5, and example of the coordinate system used is illustrated. The blade is discretised into N nodes. y is out of rotor plane displacement, and $\theta_i$ is the local slope of the beam. $\theta_i$ is negative in the case shown in FIG. 5. The curved black line is indicative of a deflected state and the straight red line is indicative of an undeflected state.

Element Mass and Stiffness Matrices

The $i^{th}$ element will have the following stiffness matrix:

$$K_{el}^i = \frac{EI}{L^3}\begin{bmatrix} 12 & 6L & -12 & 6L \\ 6L & 4L^2 & -6L & 2L^2 \\ -12 & -6L & 12 & -6L \\ 6L & 2L^2 & -6L & 4L^2 \end{bmatrix}\begin{matrix} y_i \\ \theta_i \\ y_{i+1} \\ \theta_{i+1} \end{matrix}$$

where EI is the stiffness of the element and L the length. y and $\theta$ are the displacements and slopes at the nodes (end points) of the element.

$$M_{el}^i = \frac{ML}{420}\begin{bmatrix} 156 & 22L & 54 & -13L \\ 22L & 4L^2 & 13L & -3L^2 \\ 54 & 13L & 156 & -22L \\ -13L & -3L^2 & -22L & 4L^2 \end{bmatrix}\begin{matrix} y_i \\ \theta_i \\ y_{i+1} \\ \theta_{i+1} \end{matrix}$$

where M is the mass per length of the element.

The damping matrix is introduced by Rayleigh damping, with tuned coefficients that give a logarithmic decrement of about 3% at the blade eigenfrequency.

$$D_{struc,el} = 0.1885 M_{el} + 0.0048 K_{el}$$

2.1. Aerodynamic Damping

By using the cubic deflection shape of a beam element the deflection of the centre of the element can be calculated. The deflection at the centre of the element is $$y_{c,i} = 0.5(y_i + y_{i+1}) + L/8(\theta_1 - \theta_2)$$

The sectional lift coefficient $C_1$ is approximated to be $C_1 = 2\pi\alpha$, where $\alpha$ is the angle of attack in radians. In this simple linear model the mean angle of attack is set to 0, and hence $\alpha \approx (\dot{y}/U)$ using the relative velocity of the blade $$U(x) = \sqrt{(\omega x)^2 + U_\infty^2},$$

and the rate of translation of the centre point, $\dot{y}$. The aerodynamic force on an element due to the motion of the element is $$F_{aero}^i = 2\pi \frac{-\dot{y}_c}{U}\left(\frac{1}{2}\rho U^2\right)L$$

The aerodynamic damping matrix for an element becomes:

$$D_{a,el}^i = 2\pi \frac{1}{U}\left(\frac{1}{2}\rho U^2\right)L \cdot 0.5\begin{bmatrix} 0.5 & L/8 & 0.5 & -L/8 \\ 0 & 0 & 0 & 0 \\ 0.5 & L/8 & 0.5 & -L/8 \\ 0 & 0 & 0 & 0 \end{bmatrix}\begin{matrix} \dot{y}_1 \\ \dot{\theta}_1 \\ \dot{y}_2 \\ \dot{\theta}_2 \end{matrix}$$

2.2. External Forces (the AADs)

The external forces on the blade come only from the AAD which can change the local lift coefficient by a certain amount $\Delta C_1$. If the AAD is placed at the $i^{th}$ node only, then the constant diagonal matrix can be formulated $$F_{aero} = L\left(\frac{1}{2}\rho U^2\right)\begin{bmatrix} 0 & & & & & & 0 \\ & 0 & & & & & \\ & & \ddots & & & & \\ & & & 1 & & & \\ & & & & 0 & & \\ & & & & & \ddots & \\ & & & & & & 0 \\ 0 & & & & & & 0 \end{bmatrix}\begin{matrix} y_2 \\ \theta_2 \\ \vdots \\ y_i \\ \theta_i \\ \vdots \\ y_{N+1} \\ \theta_{N+1} \end{matrix}$$

which should be multiplied by the column vector $\Delta C_1$, which contains the contribution to the lift coefficient from the active device. $\Delta C_1$ will be the control input u in the state space model.

2.3. State Space Model

The equation of motion for the system is $$M\ddot{q} + (D_{struc} + D_{aero})\dot{q} + Kq = F_{aero}\Delta C_l$$

where $q = [y_2, \theta_2, \ldots, y_i, \theta_i, \ldots, y_{N+1}, \theta_{N+1}]^T$, contains the displacements and rotations of the blade. A system of ordinary differential equations of this form $$\dot{x} = Ax + Bu$$

can be formed for this specific case:

$$\begin{bmatrix} \dot{q} \\ \ddot{q} \end{bmatrix} = \begin{bmatrix} 0 & 1 \\ M^{-1}K & M^{-1}(D_{struc} + D_{aero}) \end{bmatrix}\begin{bmatrix} q \\ \dot{q} \end{bmatrix} + \begin{bmatrix} 0 \\ M^{-1}F_{aero} \end{bmatrix}\Delta C_l.$$

where M, K and D are the assembled mass, stiffness and dampening matrices.

Assembly of System

If Kel is written as $$K_{el}^i = \begin{bmatrix} K_{11}^i & K_{12}^i \\ K_{21}^i & K_{22}^i \end{bmatrix}\begin{matrix} q_i \\ q_{i+1} \end{matrix}$$

the assembled stiffness matrix is written as $$K = \begin{bmatrix} K_{11}^1 & K_{12}^1 & & & & \\ K_{21}^1 & K_{22}^1 + K_{11}^2 & K_{12}^2 & & & \\ & & \ddots & & & \\ & & & K_{21}^i & K_{22}^i + K_{11}^{i+1} & K_{12}^{i+1} & \\ & & & & \ddots & \\ & & & & & K_{21}^{N+1} & K_{22}^{N+1} \end{bmatrix}\begin{matrix} q_1 \\ q_2 \\ \vdots \\ q_i \\ \vdots \\ q_{N+1} \end{matrix}$$

Likewise is done for the mass and damping matrix.

The boundary condition for a clamped beam is that the deflection and slope at the wall is zero. That means that $q1=0$. This can be achieved by removing the rows and columns associated with the first node (y1 and θ1) from all the matrices, reducing it to a 2N×2N system.

2.3.1. Output Equation 1: Root Bending Moment

If an equation is formulated for the system output then we have a state space formulation with a single input u (for this system $\Delta C_1$) and a single output y. The output equation has the form $$y = Cx + Du$$

The output of interest could be the root bending moment of the blade which is found by the curvature at the innermost section times the stiffness. By using the cubic shape function the curvature is found as $$\left.\frac{d^2y}{dx^2}\right|_{x=x_1} = \frac{6y_2}{L^2} - \frac{6y_1}{L^2} - \frac{4\theta_1}{L} - \frac{2\theta_2}{L}$$

and the moment is defined as $$Mz(x) = y(x)'' EI(x) \quad (1)$$

If the root moment is the desired output then the C vector becomes:

$$C_{rbm} = \begin{bmatrix} \dfrac{6EI}{L} & \dfrac{-2EI}{L} & 0 & 0 & \ldots & 0 \end{bmatrix}$$

2.3.2. Output Equation 2: Mode Shape Coordinates

Instead of using the bending moment at a given section to control the blade, it is also attempted to use the mode shapes of the blade to control the vibrations.

The mode shapes have been calculated by solving the eigenvalue problem $$(K - \lambda M) \cdot \Phi = 0$$

which gives the mode shapes in a matrix $\Phi$ with the corresponding eigenvalues $\lambda$ in a vector. The column vectors of $\Phi$ are sorted by the size of the eigenvalues, and the lowest frequency modes are in the first columns.

This can be used to modify the C matrix so that the output y is the given mode shape coordinate. The mode shape coordinate is the instantaneous level of excitement of the mode shape. Since the mode shapes are often normalized to 1 at the tip of the blade, the mode shape coordinate can also be seen as the contribution to the tip deflection. If the coordinate of the first mode shape is the desired control parameter/output the C matrix takes the form:

$$C_{mode\ 1} = [1\ 0\ 0\ \ldots\ 0][\Phi^{-1}\ 0]$$

or for mode 2:

$$C_{mode\ 2} = [0\ 1\ 0\ \ldots\ 0][\Phi^{-1}\ 0]$$

3. RESULTS—ACTUATOR PLACEMENT

Figure 6:
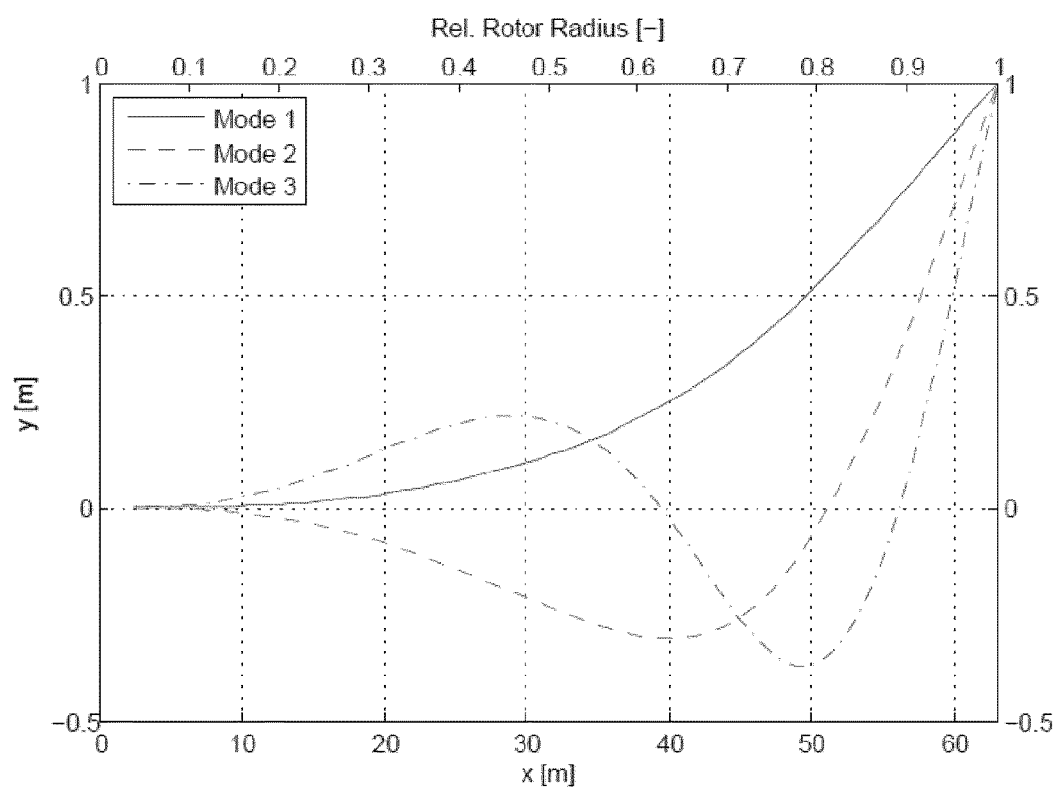
FIG. 6 is a plot of the dominant mode shapes in a wind turbine blade.

The first 3 mode shapes are given in FIG. 6, which illustrates the 3 dominant mode shapes. All mode shapes have been normalized to 1 m deflection at the tip. It is important to note that a positive deflection of the second mode shape will give a negative contribution to the root bending moment due to the negative curvature at the root (see eq. 1). This will prove to be a problem for the control of the system.

3.1. Single AAD on the Blade
3.1.1. Step Response

A recent study has been made to find the optimal placement of actuator and sensor using an aeroelastic code (Andersen, P. B., Henriksen, L. C., Gaunaa, M., Bak, C., Buhl, T., 2010. Deformable trailing edge flaps for modern megawatt wind turbine controllers using strain gauge sensors. Wind Energy (December 2009), 193-206). The conclusion was that the strain gauge sensor should be placed around 28 m from the root, when the 6.3 m flap was placed around 50 m from the root. This result was obtained by an elaborate parameter study using a heavy aeroelastic code (HAWC2). With the new model at hand it seems plausible that the outboard sensor location is due to a nonminimum phase behaviour of the root bending moment.

Figure 7:
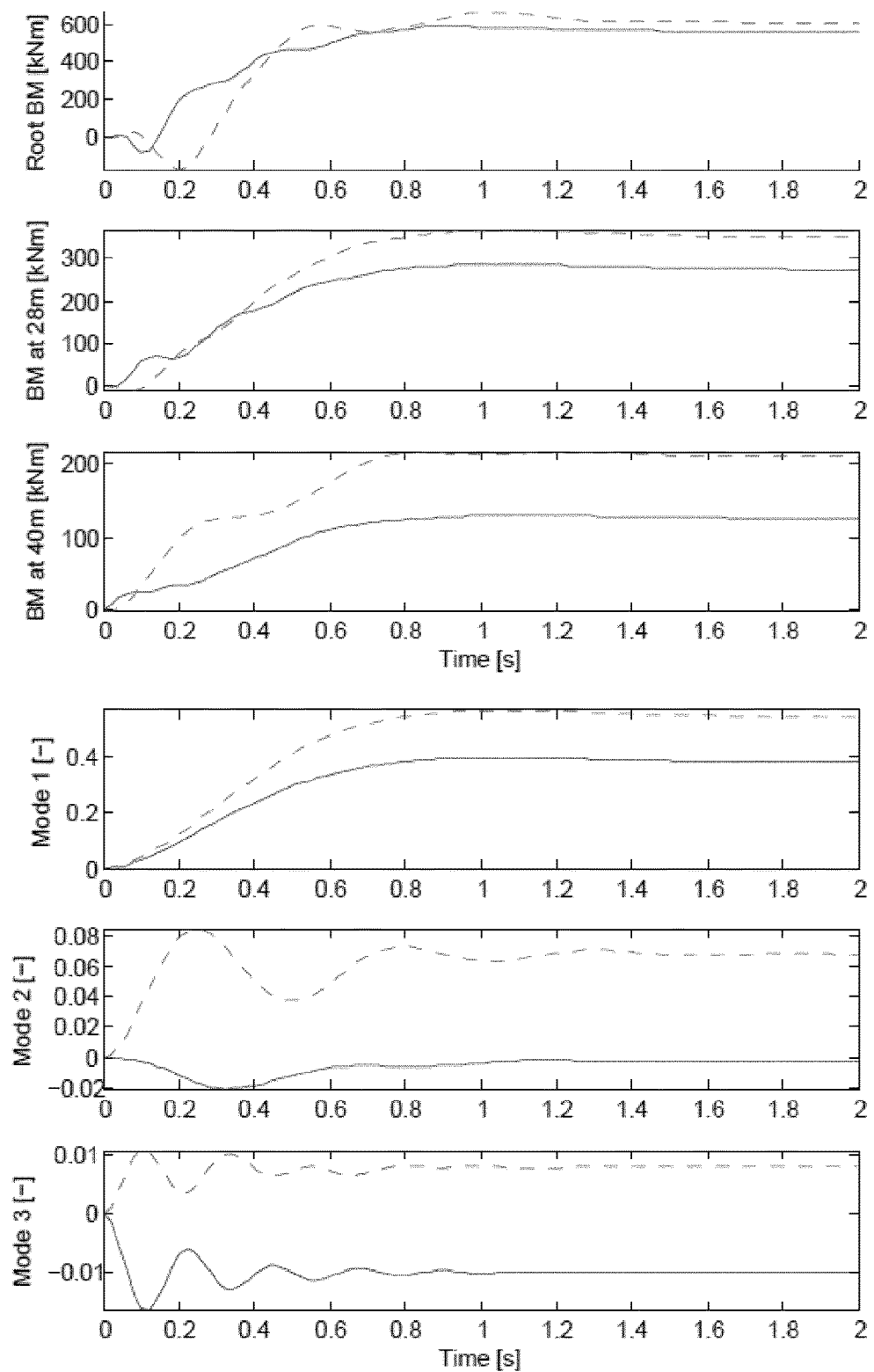
FIG. 7 is a series of plots of the step response to a flap deflection, showing bending moments and mode shape coordinates.

In FIG. 7 the step response of a flap deflection at t=0 s (made with the Matlab step command on the state space model) is shown of a 6.3 m wide flap placed at 50 m from the root (black solid line) and at 58 m from the root (red dashed line). Six sensors have been plotted, namely the root bending moment, the bending moment at 28 and 40 m, and the magnitude of the first three flapwise modes. The three upper plots show the bending moment at 3 locations; the root, at 28 m and at 40 m. The three lower plots show the mode shape coordinates of the first three flapwise modes.

As seen the excitation of the 3 mode shapes depends on where the AAD is located. If the AAD is placed at 50 m from the root (black), there is hardly any excitation of the second mode shape, because the AAD is placed in the node of the second mode shape (see FIG. 6).

Depending on where the bending moment sensors are placed, different responses are seen. If the bending moment sensor (BMS) is placed in the root, the response is clearly non-minimum phase, especially if the flap is placed far outboard. This is due to the excitation of the second mode shape, which has a negative curvature in the mode shape near the root (see FIG. 6).

As from eq. 1, the bending moment is given by the curvature of the blade. If the BMS was placed at 28 m from the root, the response from the second mode shape is not seen, because the curvature of the second mode shape is zero at 28 m. However the response is still slightly nonminimum phase, because the 3. mode shape is seen on the bending moment. If the BMS is placed at 40 m the curvature of the 3. mode shape is zero, and the response from the 3. mode shape is not seen. However the curvature of the second mode shape is not zero at 40 m, but at least it is positive. This means that it points in the same direction as the first mode shape, and hence the response is not longer minimum phase. When the flap is placed at 50 m from the root, the second mode shape is not excited, because this is where the node of the second mode shape is.

The step response of the first and second mode look like simple second order systems which are ideal to tune controllers for. Therefore modes are used as sensors in the following sections.

3.1.2. Parameter Study

The following study attempts to use the state space model to analyse the best position for a given AAD. The analysis is based on the controllability of a system, which means the ability of a system (blade with AAD) to reach a given state (deflection) within a finite time. If the system is controllable the cost of reaching a given state in a finite time, can be evaluated using gramian theory. The smaller the controllability cost is for a given configuration of AAD position and size, the better it may be for controlling the vibration of the blade. However, the controllability cost might be low on the first eigenmode, meaning that the AAD can excite the first eigenmode, but if the second mode is also excited by the same AAD movement, then the total vibration of the blade might be negatively affected.

The controllability cost, $\epsilon$, can be estimated by, $\epsilon = (1/\Lambda)$, where $\Lambda$ is the $1^{st}$ Heinkel Singular Value (HSV) of the matrix q which has been calculated by Laub's method $$\Omega_q = R^T Q_q R$$

where R is the solution to the decomposition $$P_{ij} = R^T R$$

and Pij is the controllability gramian of the system using a B vector that has been modified to the properties of having the flap at positions i and width j. The subscript q is the mode shape that one wishes to study the controllability of, and will be a parameter in $Q_q$ which is the observability gramian for a system where mode shape q is observed. The calculation of the controllability is very computationally efficient (using the lyap function in Matlab), and a parameter study can be made very fast, and the method is very feasible to use in a genetic optimizer which requires many object function evaluations.

In the following the term controllability will refer to the $\Lambda$, which is inversely proportional to controllability cost. The lower the controllability cost, the more controllability, hence higher controllability is better.

Figure 8:
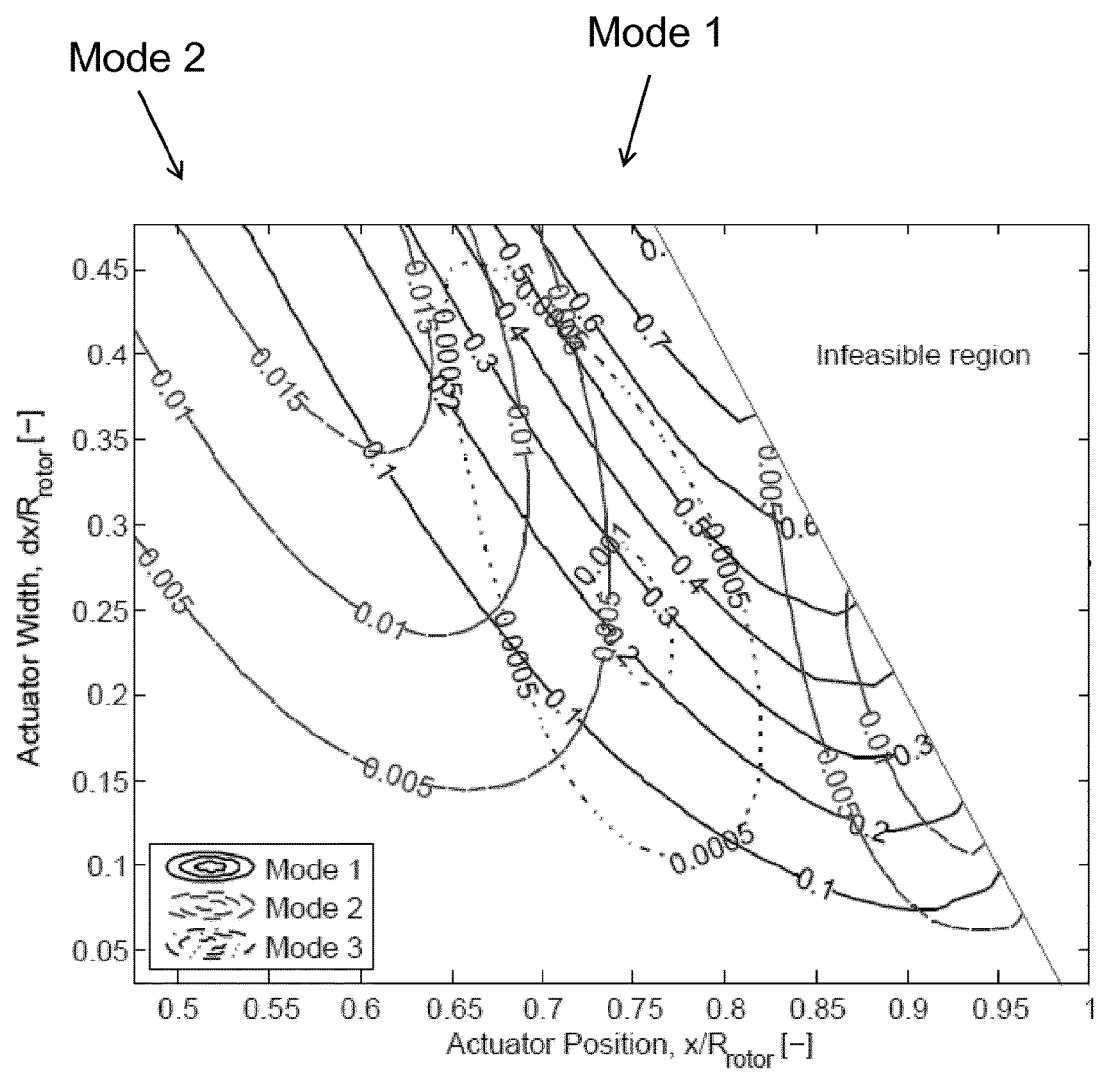
FIG. 8 is a plot of the controllability of different blade modes for different locations of AADs.

FIG. 8 illustrates the controllability, $\Lambda$, of mode 1 (black), mode 2 (red), and mode 3 (blue, dashed) for various combinations of AAD positions and widths. The "infeasible region" marks the region where the AAD extends outboard of the blade tip.

In FIG. 8, the controllability of mode 1, 2 and 3 are shown as function of flap position and width. It is clear that mode 1 is one order of magnitude higher than mode 2, and two orders of magnitude higher than mode 3. Mode 3 is expected to be of very little importance in the dynamics of the blade. The clam-shaped contours of the first mode shape show that the bigger the flap the more controllability is obtained. The optimal position is near the tip when the flap is small and goes more inboard as the flap size increases (and effectively spills over the tip of the blade where it does not contribute). The second mode shape gets excited when the flap is small and placed near the tip or larger and placed in the "valley" of the second mode shape (near x=40 m in FIG. 6).

It is interesting to see that when the flap is very small, it is maybe not wise to put the flap at the position where mode 1 is most controllable, because mode 2 will be controlled/excited as well. Therefore at e.g. a flap width of 10 m, the flap should maybe not be placed at 55 where it gives most controllability of the $1^{st}$ mode, but rather at 50 m, where it still has 75% of the controllability, but does not excite mode 2 as much. A high ratio of mode 1 over mode 2 is desired.

3.1.3. Optimization

Figure 9:
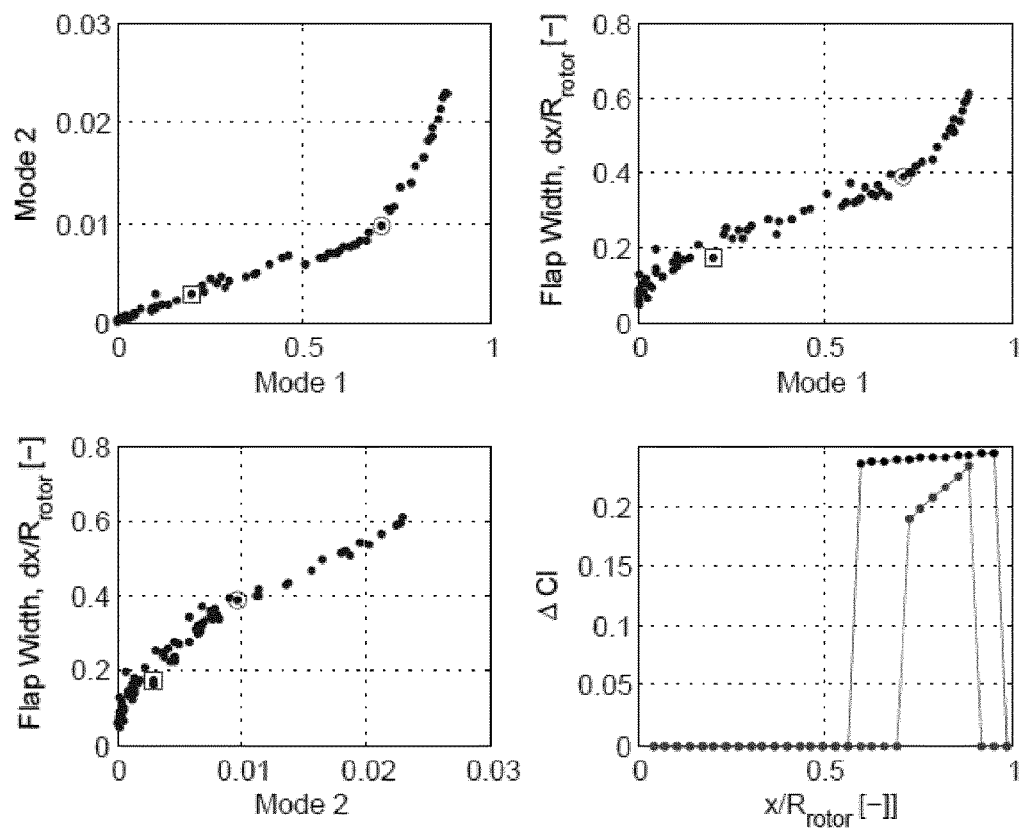
FIG. 9 is a series of plots of the controllability between mode 1 and mode 2 of the blade.

The parameter study does not disclose if another distribution of the $C_1$ distribution over the flap might reduce the cross-talk between mode 1 and mode 2. A genetic optimizer (from Matlab) was used to increase the controllability of mode 1 and decrease controllability of mode 2, and as a further objective to minimize the width of the flap. The design variables were the end positions of the flap as well as the maximum $\Delta C_1$ at each end of the flap. The $\Delta C_1$ varied linearly over the flap. The result of the optimization is shown in FIG. 9. The result is a pareto front, and hence shows the optimal solution for a given objective function value.

FIG. 9 illustrates the following:
Upper left: Pareto front between controllability, $\Lambda$, of mode 1 and mode 2.
Lower left: Pareto front between controllability of mode 1 and flap width.
Upper right: Pareto front between controllability of mode 2 and flap width.
Lower right: solution corresponding to a controllability of mode 1 of 10.

It is seen in the upper left figure that the controllability of mode 1 and mode 2 follow a linear relationship up to a point where the controllability of mode 2 increases rapidly at around a value of 10 for mode 1. This corresponds to a flap width of 20 m in the upper right plot. In the lower left plot the solution for the $\Delta C_1$ of a controllability of 10 for mode 1 is shown.

3.2. Placement of Two AADs on the Blade

Two flaps of a width of 5 m each were placed on the blade at two independent locations which were varied.

The controllability of a given combination of two flaps is again calculated as the 1st (largest) Heinkel Singular Value (HSV) of the matrix q, but now the Pij is the controllability gramian after B has been modified to include the two flaps at positions i and j. B can be modified to let the two flaps work in phase (flap in the same direction) or out of phase (flap in opposite direction). The subscript q is the given mode shape that one wishes to study the controllability of and will be a parameter in $Q_q$ which is the observability gramian for a system where mode shape q is observed.

3.2.1. Parameter Study of Flap Positions.

They are again subject to one input $\Delta C_1$, but the flaps can either move in the same direction or in opposite direction. The result is shown in FIG. 10, for the case of the two flaps of 5 m width.

Figure 10:
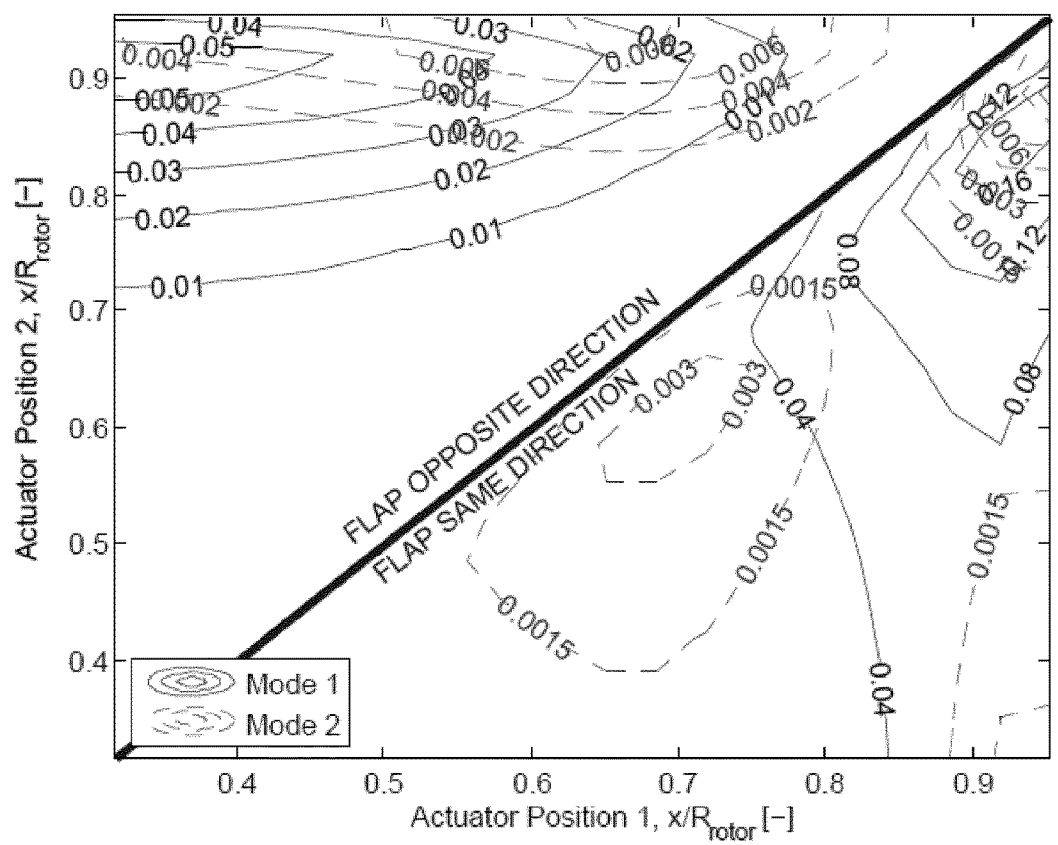
FIG. 10 is a plot of the controllability Gramian HSV corresponding to mode 1 and mode 2 during actuation of flaps.

FIG. 10 shows the Controllability Gramian HSV corresponding to mode 1 (black solid lines) and mode 2 (red dashed lines), when 2 flaps are actuated in same direction (lower triangle) and opposite directions (upper triangle). Since the two flap positions can be interchanged the contour plots are symmetric around the central blue diagonal line, and the two plots have been combined.

The lower triangle in the figure shows what happens when the flaps are moved in the same direction, and since the two flap positions can be interchanged the contour plot is symmetric around the blue centre line. It is seen that the 1st mode shape is much more controllable than the second mode shape in general. The optimal location for controlling the 1st mode shape is far outboard with the flaps at 50 m and 55 m from the root (next to each other). The optimal location for controlling the second mode is by placing the two actuators next to each other at 35 m and 40 m approximately. However when placing the actuators at the location where the first mode is actuated most, the second mode is also actuated.

The upper triangle of FIG. 10 shows the case where the two flaps are actuated in opposite directions. The picture has now changed and the second mode is now more controllable than the first mode overall. The first mode is most controllable when one flap is placed far out and the other as far inboard as possible where it does not give much force and is virtually disabled. The second mode is very controllable when one flap is placed far outboard and one is placed at 40 m at the local minimum of the second mode shape in FIG. 6. The optimal position of the two flaps is where mode one is very controllable when the two flaps are actuated in the same direction, and where mode 2 is very controllable when they are actuated in opposite directions. A genetic optimizer is used to show this trade-off 3.2.2. Optimization of Two Flaps An optimization problem was set up in which the two objectives were:
1. To maximise the controllability of mode 1 when the flaps are moved in the same direction (also denoted collective)
2. To maximize the controllability of mode 2 when the flaps are actuated in opposite directions.

The constraints used for the optimisation being that the flaps must not overlap, must not extend inboard of 40 m on the blade, must not extend further outboard than 61 m, and each flap must be between 3% and 20% of the rotor radius.

Two objective functions which should be minimized were $$\text{obj}(1) = -(\Lambda_{collective,mode1} - \Lambda_{opposite,mode1})$$

$$\text{obj}(2) = -(\Lambda_{collective,mode2} - \Lambda_{collective,mode2})$$

which represents the surplus of controllability of the given mode with the most appropriate controller (collective or opposite). The solution when the total flap length is constrained to 10 m is given in FIG. 11.

Figure 11:
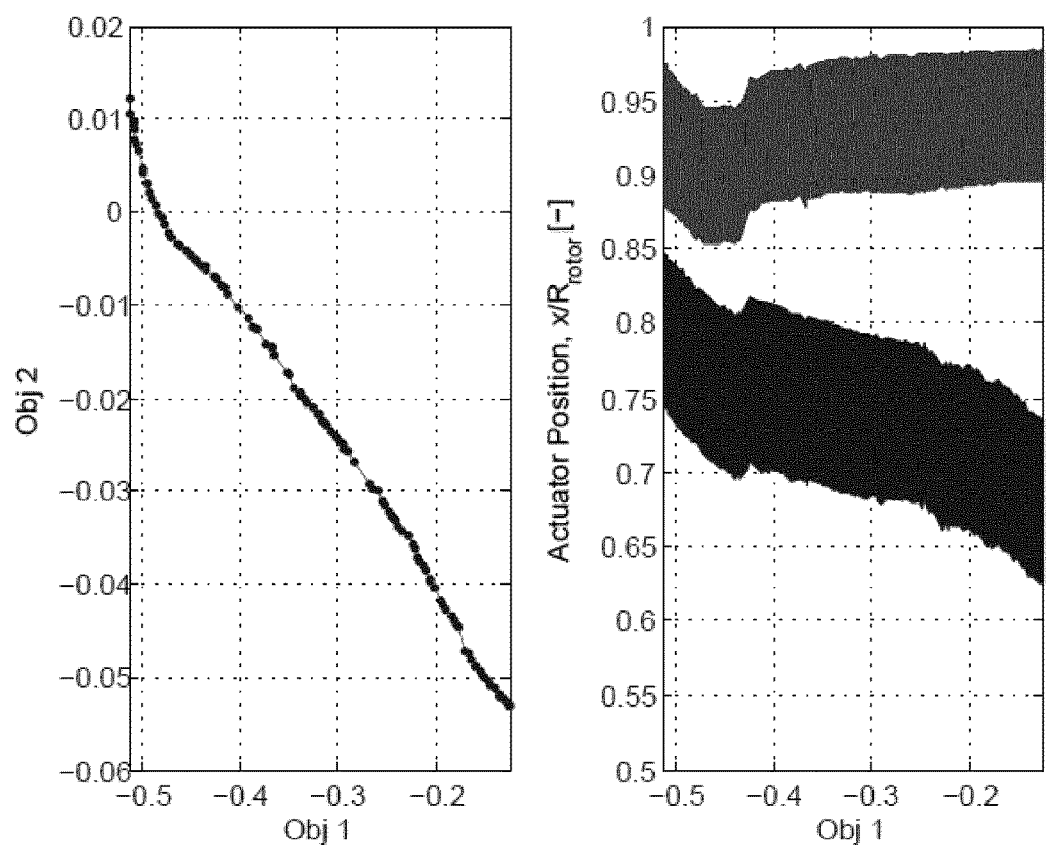
FIG. 11 shows the plots of an optimisation problem of two flaps on a wind turbine blade.

FIG. 11 shows the optimization of two flaps with a total width of 20% of the rotor radius.

4. OPTIMAL SENSOR LOCATION

Until now, the mode shapes have been determined by knowing the displacements along the blade, and using knowledge of the mode shapes to find the mode shape coordinates. Another method is by using bending moment sensors, say calibrated strain-gauges. If the first three mode shapes should be determined, and all higher order mode shapes are negligible it would at least require three BMSs. The mode shape coordinates, $Gx_i$, where i is the mode shape number are simply found by solving $$\begin{bmatrix} Mz(x_1) \\ Mz(x_2) \\ Mz(x_3) \end{bmatrix} = \begin{bmatrix} \Phi_1''(x_1)EI(x_1) & \Phi_2''(x_1)EI(x_1) & \Phi_3''(x_1)EI(x_1) \\ \Phi_1''(x_2)EI(x_2) & \Phi_2''(x_2)EI(x_2) & \Phi_3''(x_2)EI(x_2) \\ \Phi_1''(x_3)EI(x_3) & \Phi_2''(x_3)EI(x_3) & \Phi_3''(x_3)EI(x_3) \end{bmatrix} \begin{bmatrix} Gx_1 \\ Gx_2 \\ Gx_3 \end{bmatrix}$$

when the moments Mz have been measured with BMSs in locations $x_1$, $x_2$ and $x_3$. $\Phi_i''(x)$ is the curvature of the mode shape number i at location x and $EI(x)$ is the stiffness at x.

In the light of section 3.1.1, the optimal sensor location for load control can be narrowed down. If for example the third mode shape can also be neglected, only mode shape 1 is of interest for control. Accordingly, a single sensor can be placed in the zero-curvature point of the second mode shape, $x_p = 28$ m, to give the deflection of mode shape 1.

$$Gx_1 = \frac{Mz(x_p)}{\Phi_1''(x_p)EI(x_p)}$$

By knowing the first few mode shape coordinates, the instantaneous bending moment or displacement at any section can be found from the mode shapes.

5. IMPLEMENTATION OF AADS IN FLEX5

In order to assess if it is worthwhile to control both the 1st and the 2nd mode on the turbine, the aeroelastic tool FLEX5 was used. FLEX5 is an aeroelastic simulation tool that works in the time domain, and is widely used in the wind turbine industry. It was developed by Stig Øye at the Technical University of Denmark. For more information, see (Oeye, S., 1996. FLEX4—Simulation of Wind Turbine Dynamics. In: Proceedings of the 28th IEA Meeting of Experts—State of the Art of Aeroelastic Codes for Wind Turbine Calculations. April 11-12. Denmark. Lyngby, Technical University of Denmark. pp. pp. 71-76).

In the following the Upwind 5MW Reference Wind Turbine was modelled. The turbine has been modelled using the IEC Ed. 3, Wind Class 1B. The foundation was stiff at ground level. Only the normal operation, normal turbulence model, have been considered in this study. For every 0.5 m/s from a wind speed of 5 m/s to 25 m/s, a 10 min time series was simulated and analysed for fatigue. The fatigue loads were calculated by the standard procedure of IEC Ed.3, i.e. by rainflow counting the loads for each sensor for each wind speed. The fatigue load given is the damage equivalent load of the given sensor for a 20-year lifetime. For the blade loads a Wöhler-coefficient of m=10 was used, but for the tower bottom, drivetrain, and moment, a value of m=3 was used. The extreme loads were based on the same amount of load cases, just with an extreme turbulence model.

Two AADs were mounted on the blade at spanwise positions x=47 m and x=54 m each with a width of 6.3 m. This corresponds to a flap at 70% to 80% of the rotor radius and one from 80% to 90%. A flap of 10% c was used on the NACA 64618, where the deflection was limited to ±10°: The flap data was calculated using the CFD solver Ellipsys2D.

For more details, see: Baek, P., Gaunaa, M., Unsteady Wind Tunnel Results for a Miniflap and a Trailing Edge Flap on a Wind Turbine Airfoil. Wind Energy, 1-9; Michelsen, J. A., 1992. Basis3D—a Platform for Development of Multiblock PDE Solvers—AFM 92-05. Tech. rep., Technical University of Denmark; Michelsen, J. A., 1994. Block structured Multigrid Solution of 2D and 3D Elliptic PDEs—AFM 94-06. Tech. rep., Technical University of Denmark; Soerensen, N. N., 1995. General Purpose Flow Solver applied to Flow over Hills—Risoe-R-827(EN). Tech. rep., RisøNational Laboratory, Technical University of Denmark.

The flaps could change the base polar by $\Delta C_1 = 0.6$ at $\alpha = 5°$.

For all cases the same controller was used, but with different tuning constants. For all cases a SISO Plead controller was tuned to have a cross-over frequency of 7 rad/s, with a phase margin of 60°. A P-lead controller is effectively the same a Proportional Derivative control.

Four separate cases were calculated:
Base load set. No active control. Just a normal collective-pitch variable-speed controller.
BMS at x=1:5 m. A SISO controller giving the same input to the two flaps. The input to the SISO controller is the root bending moment.
BMS x=28 m. A SISO controller giving the same input to the two flaps. The input to the SISO controller is the bending moment moment at 28 m. This was almost the control strategy of Andersen (Andersen, P. B. r., 2010. Advanced Load Alleviation for Wind Turbines using Adaptive Trailing Edge Flaps: Sensoring and Control Risø-PhDReport. Ph.D. thesis).
Mode 1 controller. The mode shape 1 coordinate was input to the SISO control actuating both flaps. The two AADs were moved as one, where the feedback controller monitored the blade flapwise bending moment at x=0 m from the root.

Mode 1+2 controller. The mode shape 1 coordinate was input to a SISO control actuating both flaps in the same direction. The mode shape 2 coordinate was input to a second SISO controller actuating both flaps, but in opposite direction. The mode shape 2 controller had a cross frequency of 15 rad/s, with a phase margin of 60°.

Figure 12:
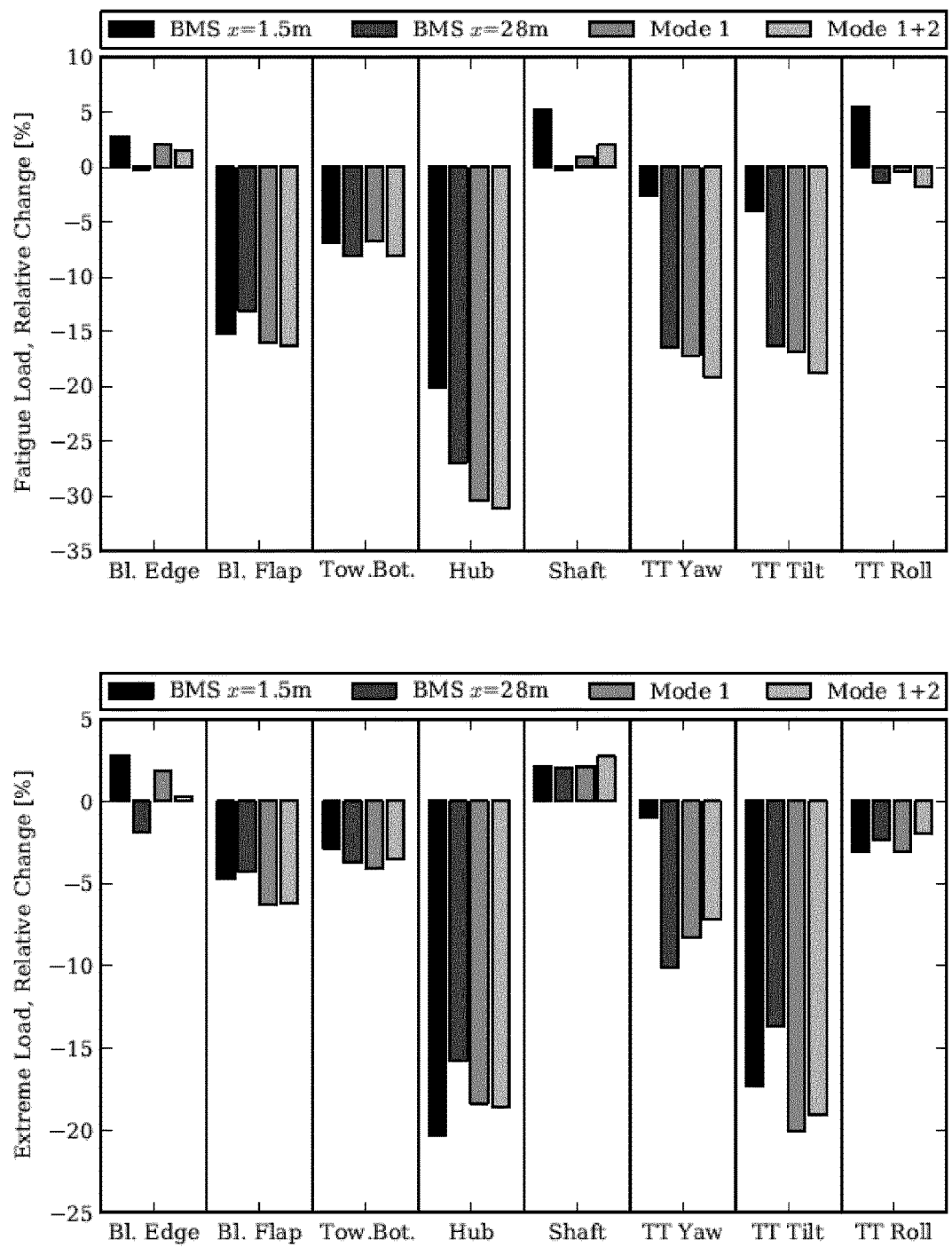
FIG. 12 is a plot of the fatigue loads measured for different components of a wind turbine as a result of different control systems used.

The different controllers are compared in FIG. 12, which illustrates fatigue loads (upper) and extreme loads (lower) of various turbine components for different controllers relative to the base case. For the fatigue loads, the four controllers are seen to give similar reductions in the flapwise load, the exception being the BMS x=28 m controller. For the other wind turbine components the mode shape controllers have an advantage, especially the mode shape 1+2 controller which has higher band-width and can reduce the low cycle fatigue, which damages the steel components. This clearly shows that the new control method proposed serves to reduce fatigue and extreme loads in a wind turbine during the lifetime of the turbine operation.

6. CONCLUSIONS

Using a finite element beam model of the Upwind 5MW reference turbine blade with and active aerodynamic devices, the influence of actuator position and sensor position on the system behaviour has been explored. The AAD are supposed to dampen and reduce the fluctuating loads, induced by e.g. turbulence, on a wind turbine blade. To study the system it was investigated how much a given AAD position could excite the blade, from the rational, that if the system can be exited, it can also be dampened actively.

Regarding the actuator position it was found that the further outboard a single AAD is placed, the better the controllability of the first mode shape. However placing the AAD far outboard will excite the higher order mode shape, where the second mode shape is most important. The influence on the second mode shape is reduced by placing the AAD in the node of the second mode shape, but at the cost of reduced controllability of the 1st mode shape. It was shown, that when the AAD is placed far outboard, the influence of the second mode shape will make the system non-minimum phase, if the output of the system is the root bending moment. The purpose of AAD is to control the root bending moment, which transfers loads to the rest of the turbine.

Model Validation

The finite element model can be validated against a textbook example [9]. For a beam with constant stiffness, length and mass of unity then the natural frequencies are given in table 1, and excellent agreement is seen for a finite element beam with 20 elements.

TABLE 1

Beam with stiffness, length and mass of unity.

| Mode | $\omega$, Theory [rad/s] | $\omega$, Model with 21 nodes [rad/s] |
|---|---|---|
| 1 | 3.516 | 3.516 |
| 2 | 22.034 | 22.035 |
| 3 | 61.7010 | 61.698 |
| 4 | 120.912 | 120.910 |

Through appropriate analysis and monitoring of blade mode shape, it is possible to efficiently and accurately control blade vibrations and loading during operation.

Figure 13:
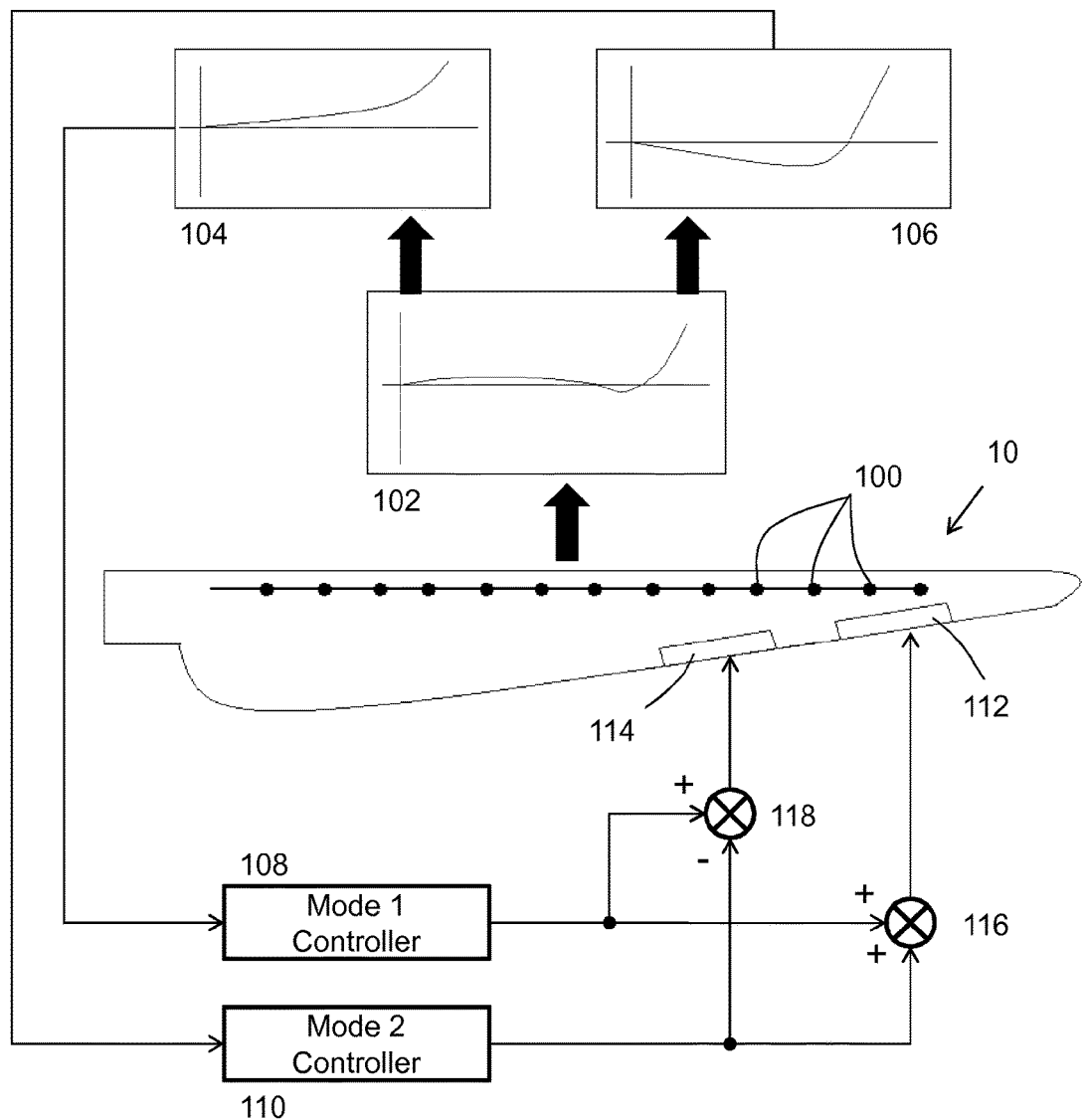
FIG. 13 is a schematic for a control system according to the invention.

With reference to FIG. 13, a schematic of a control method for a wind turbine blade 10 is illustrated. The blade 10 is coupled to a controller (not shown) which comprises a processing device and a computer readable storage medium. The controller is coupled to a plurality of sensors 100 provided along the length of the blade 10, the sensors operable to detect a deflection of a blade. The sensors may comprise any suitable array of deflection detecting elements, e.g. accelerometers, blade moment sensors, strain gauges, optical deflection sensors, position sensors (e.g. GPS sensors), etc.

During operation of the wind turbine blade 10 on a wind turbine, the blade 10 will experience deflection based on the forces encountered during rotation. The sensors 100 are operable to output a measurement of this deflection 102.

The controller receives the deflection measurement 102, and performs a mathematical analysis of the shape of the deflection, to determine from the deflection 102 the excitement level of the mode 1 shape of the blade 104 and the excitement level of the mode 2 shape of the blade 106.

Based on the different mode excitement levels or values 102,104, the controller initialises different control schemes. The excitement level of the mode 1 shape 102 is used to regulate a mode 1 control system 108, while the excitement level of the mode 2 shape 106 is used to regulate a mode 2 control system 110.

The outputs of the control systems 108,110 are used as inputs to a pair of active lift devices 112,114 provided on the blade 10, at the blade trailing edge. A first active lift device 112 is positioned toward the tip end of the blade 10, while a second active lift device 114 is positioned between the first active device 112 and the root end of the blade, preferably on the opposite side of the location of the node of the mode 2 shape of the blade 10. The active lift devices 112,114 may comprise any device capable of adjusting the lift characteristics at the location of the active device, e.g. a flap, a spoiler, a tab, a fluid injection device, etc.

The first active lift device 112 is controlled based on a summation 116 of the output of the mode 1 controller 108 and the mode 2 controller 110. The second active lift device 114 is controlled based on a negative addition 118 of the output of the mode 1 controller 108 and the mode 2 controller 110. The active lift devices 112,114 are accordingly controlled in a feedback system to reduce the magnitude of the vibrations of the blade, and consequently reduce loading in the blade and the wind turbine.

To control the mode 1 shape of the blade 10, the active lift devices 112,114 are actuated in the same direction. To control the mode 2 shape of the blade 10, the active lift devices 112,114 are actuated in opposite directions.

Varying the active lift devices 112,114 based on the deflection of the blade, and in particular the excitement levels of the blade modes, provides a method of controlling blade vibrations which combines effectiveness with reduced computational complexity. Controlling the active lift devices 112,114 in this manner on either side of the node of the mode 2 shape ensures that there is minimal cross-talk or interference between the blade modes, which acts to reduce the magnitude of blade vibrations.

In one enhancement of the invention, the control scheme applied may be tuned based on the magnitude of the vibrations detected in the blade. For relatively low vibrations, it may be sufficient to only control the mode 1 shape, while if the vibrations are relatively high, it would be preferable to perform a control of the mode 1 and the mode 2 shapes.

For example, when the blade deflection 102 is below a threshold value, it may be sufficient to actuate the active lift devices 112,114 to control only the mode 1 shape of the blade. In the system illustrated in FIG. 13, this may be accomplished by disabling the mode 2 controller 110 for periods when the blade deflection 102 is beneath a predefined threshold deflection, and only operating the mode 1 controller 108 for deflections beneath the threshold. If the blade deflection 102 exceeds the threshold, the control system is operable to enable the mode 2 controller 110, thereby operating a control scheme to reduce both the mode 1 and the mode 2 shapes of the blade 10.

While the above example illustrates control of a mode 1 and mode 2 excitations of a blade (these mode shapes being the dominant mode shapes during blade excitation and vibration), it will be understood that a similar system may be used to control only the dominant mode 1 shape. Such a system may require control of only a single active lift device, possibly positioned at the node of the mode 2 shape, to ensure that any actuation of the active lift device for the mode 1 shape does not separately excite the mode 2 shape.

It will be understood that the control system may be varied for use with any suitable configurations of blade, sensors, and/or active lift devices. In some embodiments, it may be sufficient to use the co-ordinate value of the blade mode shape as an input to an active lift device to control that particular blade mode.

The invention is not limited to the embodiment described herein, and may be modified or adapted without departing from the scope of the present invention.

The invention claimed is:

1. A method of controlling a wind turbine blade during operation of a wind turbine to reduce root moments of the blade, the blade having a tip end and a root end, the method comprising the steps of:
   identifying an excited mode shape of the wind turbine blade;
   adjusting at least one active lift device provided on said blade to reduce a modal vibration of said blade during operation of said wind turbine, wherein said step of adjusting is based on said identified excited mode shape, wherein the modal vibration of said blade is substantially provided by a combination of the excitement of a mode 1 shape and the excitement of a mode 2 shape of said blade; and
   providing first and second active lift devices on the blade, said first and second active lift devices selectively actuatable to control said mode 1 and mode 2 shapes, wherein the location of said first and second active lift devices on the blade are selected to provide minimum interference between the mode 1 and mode 2 shapes as the active lift devices are actuated.

2. The method of claim 1, wherein said step of identifying an excited mode shape comprises:
   measuring a deflection of said wind turbine blade, and
   comparing said measured deflection with at least one known mode shape of said wind turbine blade to determine an excitement level for said at least one mode shape,
   wherein said step of adjusting comprises actuating said at least one active lift device based on said excitement level to reduce the magnitude of said excited mode shape, to reduce a modal vibration of said blade.

3. The method of claim 1, wherein the modal vibration of said blade is based at least on the excitement of a mode 1 shape of said blade, and wherein the method comprises the steps of:
   providing at least a first active lift device at a location towards the tip end of said blade; and
   actuating said at least a first active lift device to control the excitement level of mode 1 shape, using the excitement co-ordinate of said mode 1 shape as an input to said at least a first active lift device.

4. The method of claim 1, wherein the method comprises the steps of:
   providing a first active lift device at a location along the length of the blade between the node of said mode 2 shape and the tip end of the blade; and
   providing a second active lift device at a location along the length of the blade between the node of said mode 2 shape and the root end of the blade.

5. The method of claim 1, wherein said step of comparing comprises analyzing said measured deflection to determine an excitement value for the mode 1 shape of the blade and an excitement value for the mode 2 shape of the blade, and wherein said step of actuating comprises actuating said first active lift device and said second active lift device based on a combination of the excitement values for the mode 1 and mode 2 shapes of the blade.

6. The method of claim 1, wherein the method comprises the step of:
   comparing said excitement value for the mode 1 shape of the blade with a threshold value, and
   when said mode 1 excitement value exceeds said threshold value, performing a mode 1 control operation, and
   when said mode 1 excitement value is less than said threshold value, performing a mode 1 control operation and a mode 2 control operation.

7. The method of claim 6, wherein said step of performing a mode 1 control operation comprises actuating said active lift devices to reduce the magnitude of the excited blade mode 1 shape.

8. The method of claim 6, wherein said step of performing a mode 2 control operation comprises actuating said active lift devices to reduce the magnitude of the excited blade mode 2 shape.

9. The method of claim 1, wherein the method comprises the steps of:
   controlling the mode 1 shape of said blade by actuating said first and second active lift devices in the same direction; and
   controlling the mode 2 shape of said blade by actuating said first and second active lift devices in opposite directions.

10. A method of designing a wind turbine blade, comprising:
    providing a wind turbine blade;
    performing a modal analysis of said wind turbine blade to determine the mode 1 and mode 2 shapes of the wind turbine blade; and
    positioning at least one active lift device on said wind turbine blade based on said at least one determined mode shape, such that an excitement level of said at least one determined mode shape can be controlled by actuation of said active lift device;
    wherein a location of said at least one active lift device on said wind turbine blade is selected to provide minimum interference between the mode 1 and mode 2 shapes as said at least one active lift device is actuated.

11. The method of claim 10, wherein said step of positioning comprises providing said active lift device on said wind turbine blade at a location along the length of the blade corresponding to the node of said mode 2 shape, such that said active lift device is operable to control an excitement level of said mode 1 shape without affecting an excitement level of said mode 2 shape.

12. The method of claim 10, wherein said step of positioning comprises providing a first active lift device and a second active lift device on said wind turbine blade,
- wherein said first active lift device is provided at a first location along the length of the blade and said second active lift device is provided at a second location along the length of the blade,
- wherein the location of said first and second active lift devices on the blade are selected to provide minimum cross-talk between the mode 1 and mode 2 shapes as the active lift devices are actuated.

13. The method of claim 12, wherein said first active lift device is provided at a location along the length of the blade between the node of said mode 2 shape and the tip end of the blade, and wherein said second active lift device is provided at a location along the length of the blade between the node of said mode 2 shape and the root end of the blade, such that the active lift devices are operable to control excitement levels of said mode 1 shape and said mode 2 shape.

14. A wind turbine blade designed according to the method of claim 10.

* * * * *